United States Patent
Huang et al.

(10) Patent No.: US 12,150,041 B2
(45) Date of Patent: Nov. 19, 2024

(54) NETWORK ACCESS METHOD AND APPARATUS, NETWORK DEVICE, AND COMPUTER READABLE STORAGE MEDIUM

(71) Applicant: ZTE Corporation, Shenzhen (CN)

(72) Inventors: Ying Huang, Shenzhen (CN); Lin Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 38 days.

(21) Appl. No.: 18/115,276

(22) Filed: Feb. 28, 2023

(65) Prior Publication Data
US 2023/0209448 A1 Jun. 29, 2023

Related U.S. Application Data

(63) Continuation of application No. 17/266,343, filed as application No. PCT/CN2019/100072 on Aug. 9, 2019, now Pat. No. 11,622,320.

(30) Foreign Application Priority Data

Aug. 9, 2018 (CN) .......................... 201810904077.X

(51) Int. Cl.
| | | |
|---|---|---|
| H04W 48/16 | (2009.01) | |
| H04W 48/18 | (2009.01) | |
| H04W 88/14 | (2009.01) | |
| H04W 92/20 | (2009.01) | |

(52) U.S. Cl.
CPC .......... *H04W 48/16* (2013.01); *H04W 48/18* (2013.01); *H04W 88/14* (2013.01); *H04W 92/20* (2013.01)

(58) Field of Classification Search
CPC ...... H04W 48/16; H04W 48/18; H04W 88/14
See application file for complete search history.

(56) References Cited

U.S. PATENT DOCUMENTS

| | | |
|---|---|---|
| 2018/0192412 A1 | 7/2018 | Novlan et al. |
| 2019/0357117 A1* | 11/2019 | Cudak ................. H04W 72/535 |
| 2019/0394687 A1* | 12/2019 | Kowalski .......... H04W 36/0061 |
| 2021/0022174 A1* | 1/2021 | Park ...................... H04W 72/21 |

FOREIGN PATENT DOCUMENTS

| | | | |
|---|---|---|---|
| WO | WO 2018/063892 A | 4/2018 | |

OTHER PUBLICATIONS

Chinese Office Action with English Translation of Notification of the First Office Action for Chinese Patent Application No. 20180904077.X dated Nov. 18, 2021, 10 pages.
Indian Office Action with English Translation for Indian Patent Application No. 202117004864 dated Oct. 18, 2022, 6 pages.
(Continued)

*Primary Examiner* — Wayne H Cai
(74) *Attorney, Agent, or Firm* — Crowell & Moring LLP

(57) ABSTRACT

Provided are a network access method and apparatus, a network device, and a storage medium. The network access method includes: a current integrated access and backhaul (IAB) node acquiring information about cell access from an upstream IAB node; and the current IAB node determining a candidate cell and/or executing an access attempt according to the information about the cell access.

20 Claims, 2 Drawing Sheets

(56) References Cited

OTHER PUBLICATIONS

CATT; "Consideration on startup procedure for L2 IAB architecture"; 3GPP TSG-RAN WG2 #101bis, Sanya, China, Apr. 16-20, 2018; R2-1804492; 4 pages.
Ericsson et al.; "RN indicator in RRC connection establishment"; 3GPP TSG-RAN#71bis, Xian, China, Oct. 11-15, 2010; R2-105534; 3 pages.
Huawei; "Topology type, discovery and update for IAB"; 3GPP TSG-RAN WG3 Meeting #100, Busan, Korea, May 21-25, 2018; R3-183189; 5 pages.
KDDI Corporation et al.; "Consideration on IAB node discovery and connection establishment"; 3GPP TSG-RAN WG2 #102, Busan, Korea, May 21-25, 2018; R3-182588; 3 pages.
Nokia et al.; "Measurements for IAB"; 3GPP TSG-RAN WG2 Meeting NR Adhoc 1807, Montreal, Canada, Jul. 2-6, 2018; R2-1810305; 5 pages.
Nokia et al.; "IAB Topology Discovery for Routing and Topology Management"; 3GPP TSG-RAN WG3 NR AdHoc 1807, Montreal, Canada, Jul. 2-6, 2018; R3-183750; 6 pages.
Samsung; "Evaluation Methodology for NR IAB"; 3GPP TSG-RAN WG1 Meeting #93, Busan, Korea, May 21-25, 2018; R1-1807642; 15 pages.

Communication pursuant to Rules 70(2) and 70a(2) EPC dated Sep. 28, 2021 for European Application No. 19846731.8; 1 page.
Extended European Search Report completed Aug. 31, 2021 for European Application No. 19846731.8; 15 pages.
International Search Report and Written Opinion with English Translation for International Patent Application No. PCT/CN2019100072 dated Oct. 28, 2019, 8 pages.
ZTE, "Discussion on IAB Node Discovery and Selection" *3GPP TSG-RAN WG2 NR AdHoc* 1807, R3-183689, Jul. 6, 2018, Sections 1-3, 4 pages.
Qualcomm Incorporated, "Enhancements to Support NR Backhaul Links" *3GPP TSG RAN WG1 Meeting #93*, Rt-1807393, May 25, 2018, Sections 1-3, 16 pages.
Qualcomm Incorporated, "IAB Topology Adaptation for Architecture Group 1" *3GPP TSG-RAN WG3 Meeting #AG1807*, R3-183731, Jul. 6, 2018, Sections 2-3, 8 pages.
AT&T, "Summary of 7.7.1 Enhancements to Support NR Backhaul Links" *3GPP TSG RAN WG1 Meeting #93*, R1-1807769, May 25, 2018, Sections 2.1 and 2.2, 20 pages.
Communication pursuant to Article 94(3) EPC for European Patent Application No. 19846731.8 dated Sep. 14, 2023, 16 pages.
CATT; "Considerations on startup procedure for L2 IAB architecture"; 3GPP TSG-RAN WG2 #102, Busan, South Korea, May 21-25 2018, R2-1807558; 4 pages.

* cited by examiner

NETWORK ACCESS METHOD AND APPARATUS, NETWORK DEVICE, AND COMPUTER READABLE STORAGE MEDIUM

RELATED APPLICATION

This application is a continuation application of U.S. application Ser. No. 17/266,343, filed on Feb. 5, 2021, which is a national stage application, under 35 U. S.C. § 371, of International Patent Application No. PCT/CN2019/100072, filed with the China National Intellectual Property Administration, PRC on Aug. 9, 2019, which claims priority to Chinese Patent Application No. 201810904077.X, filed on Aug. 9, 2018, all of which are incorporated herein by reference in their entireties.

TECHNICAL FIELD

The embodiments of the present disclosure relate to, but are not limited to, the field of network communications and, in particular, relate to, but are not limited to, a network access method and apparatus, a network device, and a computer-readable storage medium.

BACKGROUND

New Radio (NR) has a larger available bandwidth than Long Term Evolution (LTE). The use of massive multiple-input multiple-output (MIMO) and multi-beam makes it possible to study and apply integrated access and backhaul (IAB) links. Through radio backhaul links and relay links, dense NR cell networks can be deployed more flexibly without increasing the deployment of dense transmission networks. An access node that supports the radio access of a user equipment (UE) and wirelessly backhauls a data packet of a user plane or a control plane is referred to as an IAB node. An access node that provides the IAB node with a radio backhaul function to make a core network accessed by the UE which has access to the IAB node is referred to as an IAB donor. The IAB node may access another IAB node (also referred to as a parent IAB node) or the IAB donor through an air interface. The data packet of the user plane or the control plane may be transmitted between access nodes through radio backhaul links. An access link and a backhaul link may use the same carrier frequency or different carrier frequencies. The data packet of the user plane or the control plane may be transmitted through a multi-hop relay backhaul link between an access node and a core network element. In the related art, due to the lack of an IAB access method in an IAB architecture, a successful transmission of the data packet cannot be guaranteed.

SUMMARY

Embodiments of the present disclosure provide a network access method and apparatus, a network device, and a computer-readable storage medium, which mainly solve the problem in the related art of IAB access in an IAB architecture.

The embodiments of the present disclosure provide a network access method including steps described below.

A current integrated access and backhaul (IAB) node acquires information about cell access from an upstream IAB node.

The current IAB node determines a candidate cell and/or executes an access attempt according to the information about the cell access.

The embodiments of the present disclosure further provide a network access apparatus including an information acquisition module and a network access module.

The information acquisition module is configured to acquire information about cell access from an upstream IAB node.

The network access module is configured to determine a candidate cell and/or execute an access attempt according to the information about the cell access.

The embodiments of the present disclosure further provide a network device. The network device includes a processor, a memory, and a communication bus.

The communication bus is configured to implement connection and communication between the processor and the memory.

The processor is configured to execute one or more computer programs stored in the memory to implement the steps of the preceding network access method.

The embodiments of the present disclosure further provide a computer-readable storage medium. The computer-readable storage medium stores one or more programs executable by one or more processors to implement the steps of the preceding network access method.

According to the network access method and apparatus, the network device, and the storage medium provided by the embodiments of the present disclosure, the current integrated access and backhaul (IAB) node acquires the information about the cell access from the upstream IAB node, and the current IAB node determines the candidate cell and/or executes the access attempt according to the information about the cell access, thereby implementing the access of the IAB node through the information about the cell access and a successful transmission of a data packet.

DETAILED DESCRIPTION

Embodiments of the present disclosure are optionally described below in detail through specific implementations in conjunction with the drawings. It is to be understood that the embodiments described herein are merely intended to explain the present application and not to limit the present application.

Figure 1:
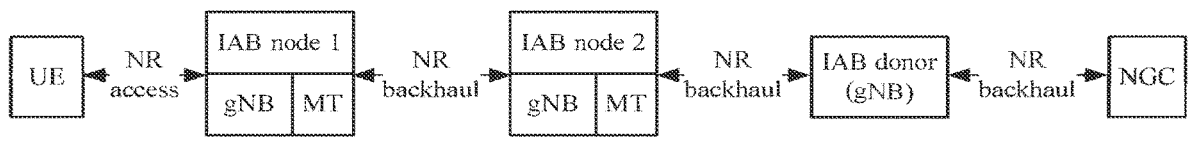
FIG. 1 is a schematic diagram of an IAB scenario according to an embodiment of the present disclosure.
Figure 2:
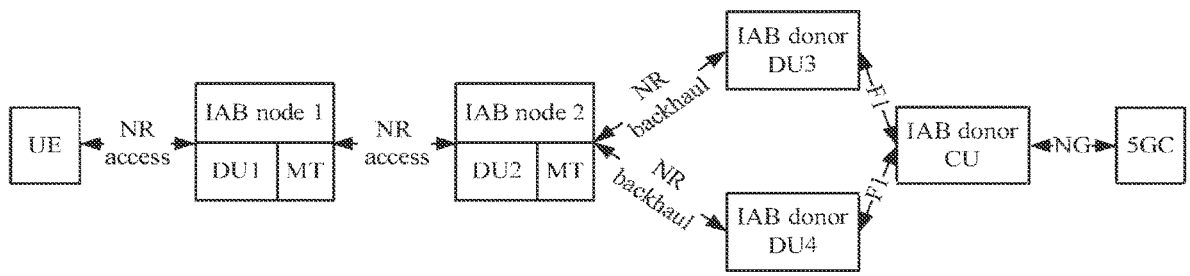
FIG. 2 is a schematic diagram of an IAB scenario according to an embodiment of the present disclosure.

As shown in FIG. 1, an uplink data packet of a UE may be sent to an IAB donor via two IAB nodes and then sent to a next-generation (5G) core (NGC) network. On the other hand, an important characteristic of NR is to support centralized unit/distributed unit (CU/DU) split, that is, a next-generation Node B (gNB) is composed of CU and DU logic functions. FIG. 2 is a schematic diagram in which IAB is supported in a CU/DU split scenario. In addition, the CU may be composed of control plane (also referred to as a CU-CP) and user plane (also referred to as CU-UP) logic functions.

First Embodiment

Figure 3:
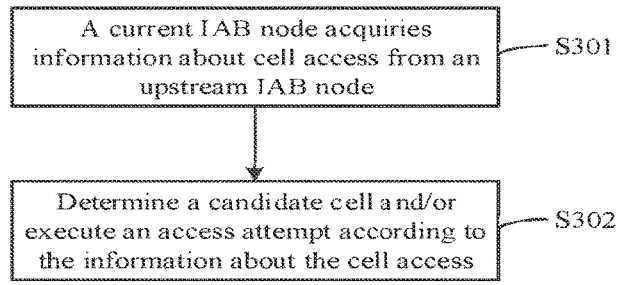
FIG. 3 is a flowchart of a network access method according to a first embodiment of the present application.

This embodiment provides a network access method. Referring to FIG. 3, the network access method includes S301 and S302.

In S301, a current integrated access and backhaul (IAB) node acquires information about the cell access from an upstream IAB node.

In S302, the current IAB node determines a candidate cell and/or executes an access attempt according to the information about the cell access.

In this embodiment, the step of determining the candidate cell is determining whether to use a corresponding cell as the candidate cell according to the information about the cell access; and the step of executing the access attempt is determining whether to execute the access attempt according to the information about the cell access.

In some embodiments, the information about the cell access may include at least one of information indicating whether a cell is barred, information indicating whether a cell is reserved, information indicating that a cell is reserved for IAB, information indicating that a cell is allowed to be accessed by an IAB node, or access control information.

In some embodiments, the access control information includes access control parameters corresponding to access categories and/or access identities.

In some embodiments, the upstream IAB node may include a parent IAB node or an IAB donor.

In some embodiments, the step in which the current IAB node acquires the information about the cell access from the upstream IAB node includes that the current IAB node acquires the information about the cell access from the upstream IAB node through a system message.

In some embodiments, the step in which the current IAB node determines the candidate cell and/or executes the access attempt according to the information about the cell access includes that the current IAB node determines whether to use a cell corresponding to the information about the cell access as the candidate cell or whether to execute the access attempt according to at least one of an access identity, an access category, or the information about the cell access.

In some embodiments, before the IAB node determines whether to use the cell corresponding to the information about the cell access as the candidate cell or whether to execute the access attempt, the method further includes that the current IAB node determines the access identity and/or the access category according to pre-configuration information and/or a predefined rule.

In some embodiments, the method may further include that the current IAB node sends assistance information to the upstream IAB node.

In some embodiments, the assistance information includes at least one of IAB node indication information, an IAB-related connection setup reason value, a mobile terminal (MT) part identity, a distributed unit (DU) part identity, a dedicated core network identity (DCN ID) for IAB, Single Network Slice Selection Assistance Information (S-NSSAI) for IAB, a Slice/Service type (SST) for IAB, a slice differentiator (SD) for IAB, information about S-NSSAI supported by an IAB node, information about a Slice/Service type supported by an IAB node, information about a DCN ID supported by an IAB node, or information indicating whether to support IAB.

In some embodiments, the step in which the current IAB node sends the assistance information to the upstream IAB node may include that the current IAB node sends the assistance information to the upstream IAB node through at least one of a Radio Resource Control (RRC) message, an F1 message, an X2 message, or an Xn message.

In some embodiments, the method may further include that the current IAB node receives information about the IAB capability of the upstream IAB node or a core network element from the upstream IAB node or the core network element.

In some embodiments, the core network element may include a Mobility Management Entity (MME) or an Access and Mobility Management Function (AMF).

In some embodiments, before or after the current IAB node receives the information about the IAB capability of the core network element from the core network element, the method may further include that the current IAB node sends the information about the IAB capability to the core network element.

In some embodiments, the information about the IAB capability includes at least one of information about supported S-NSSAI, information about a supported Slice/Service Type, information about a supported DCN ID, or information indicating whether to support IAB.

In this embodiment, the IAB node may function as a gNB-DU, and an IAB donor gNB may function as an IAB donor DU and/or an IAB donor CU.

This embodiment provides the network access method in which the current integrated access and backhaul (IAB) node acquires the information about the cell access from the upstream IAB node, and the current IAB node determines the candidate cell and/or executes the access attempt according to the information about the cell access, thereby implementing the access of the IAB node through the information about the cell access and a successful transmission of a data packet.

Second Embodiment

Figure 4:
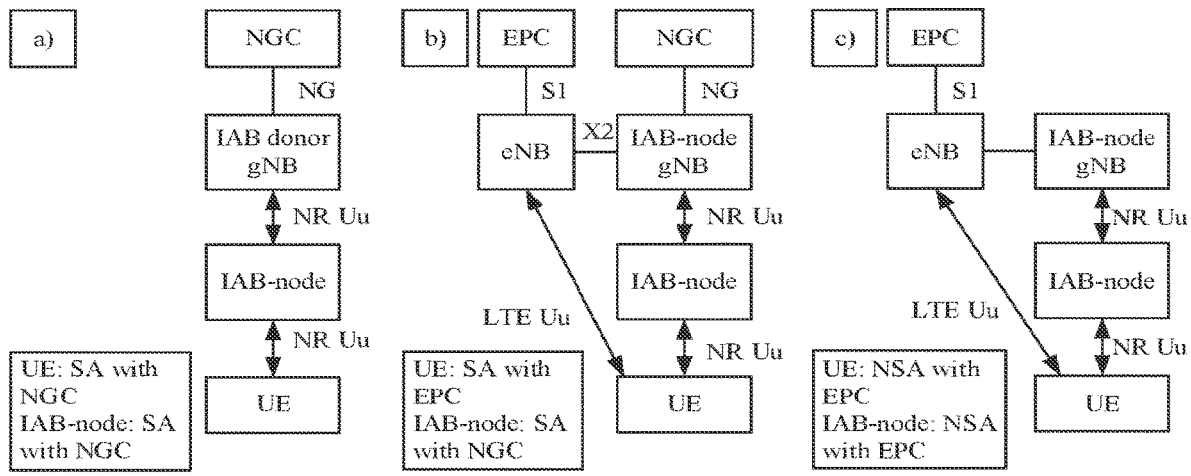
FIG. 4 is a schematic diagram of IAB access according to an embodiment of the present disclosure.

This embodiment provides a manner for access to an IAB node or an IAB donor. The diagram of a scenario in this embodiment is shown in FIG. 4. A UE accesses a network in an Evolved-Terrestrial Radio Access-New Radio dual connectivity (EN-DC) manner, IAB node 1 and IAB node 2 access the network in a standalone (SA) manner. It is to be noted that this embodiment uses a CU/DU split scenario as an example but is also applicable to a CU/DU non-split scenario in which the IAB node and/or the IAB donor function as a gNB.

In this embodiment, a system message from the IAB node or the IAB donor includes information about cell access. The system message may be a master information block (MIB), a system information block (SIB) 1, or other system messages. The information about the cell access includes at least one of information indicating whether a cell is barred, information indicating whether a cell is reserved, information indicating that a cell is reserved for IAB, or information indicating that a cell is allowed to be accessed by an IAB node.

After receiving the system message from the IAB node or the IAB donor, the UE or an IAB node MT determines whether to use a cell as a candidate cell in a cell selection/reselection process or determines whether to execute an access attempt (or perform a Radio Resource Control (RRC) connection setup process) according to the information about the cell access included in the system message. For example, the UE determines not to use the cell as the candidate cell or not to execute the access attempt if the system message includes one of the following information, and the IAB determines that the cell may be used as the candidate cell or the access attempt may be executed in a case where it is determined that the system message does not include the following information:
  (1) the information indicating that a cell is barred and the information indicating that a cell is reserved for IAB node;
  (2) the information indicating that a cell is barred and the information indicating that a cell is allowed to be accessed by an IAB node;
  (3) the information indicating that a cell is reserved for IAB;
  (4) the information indicating that a cell is reserved and the information indicating that a cell is reserved for IAB; or
  (5) the information indicating that a cell is reserved and the information indicating that a cell is allowed to be accessed by an IAB node.

Optionally, if the IAB node MT determines to execute the access attempt, the IAB node MT indicates that the IAB node MT is the IAB node or that a connection setup reason value is IAB-related in a message sent to a base station (a parent IAB node or the IAB donor) in an RRC connection setup process, and for example, the message may be an RRC connection setup request message. It is to be noted that this embodiment is also applicable to a case where the IAB node accesses the network in a non-standalone (NSA) manner.

Third Embodiment

This embodiment provides a manner for access to an IAB node or an IAB donor. The diagram of a scenario in this embodiment is still as shown in FIG. 4. A UE accesses a network in an EN-DC manner, and IAB node 1 and IAB node 2 access the network in an SA manner. It is to be noted that this embodiment uses a CU/DU split scenario as an example but is also applicable to a CU/DU non-split scenario in which the IAB node and/or the IAB donor function as a gNB.

In this embodiment, an access identity corresponding to IAB is configured for an IAB node MT and/or an access category corresponding to IAB is defined for the IAB node MT. The IAB node MT determines the access category corresponding to IAB before initiating an access attempt. A system message (such as an SIB1) received by the UE from the IAB node or the IAB donor includes access control information (also referred to as barring control information), where the access control information includes access control parameters corresponding to access categories and access identities. The UE determines the corresponding access control parameters according to the access control information obtained from the system message and an access category and an access identity corresponding to the access attempt, and determines whether to use a cell as a candidate cell or whether to execute the access attempt according to the access control parameters.

Optionally, if the IAB node MT determines to execute the access attempt, the IAB node MT includes IAB node indication information or indicates that a connection setup reason value is IAB-related in a message sent to a base station (a parent IAB node or the IAB donor) in an RRC connection setup process, and for example, the message may be an RRC connection setup request message. It is to be noted that the method is also applicable to a case where the IAB node accesses the network in an NSA manner.

It is worth mentioning that the second embodiment and the third embodiment may be used in combination.

Fourth Embodiment

This embodiment provides a manner for access to an IAB node or an IAB donor. In this embodiment, a core network accessed by the IAB node is 5GC. In this embodiment, a dedicated function entity or network or network slice is defined for IAB, and a Slice/Service type (SST) value and/or a slice differentiator (SD) value corresponding to the network slice for IAB are defined. The IAB node obtains S-NSSAI for IAB which includes the Slice/Service type (SST) value and/or the slice differentiator (SD) value. Alternatively, the IAB node obtains a corresponding Temp ID which includes corresponding core network (CN) identity information such as AMF identity information. An IAB node MT sends the Temp ID and/or the S-NSSAI to a parent IAB node or the IAB donor in an RRC connection setup process (or an Attach or tracking area update (TAU) or routing area update (RAU) process). Alternatively, the IAB node MT includes IAB node indication information or indicates that a connection setup reason value is IAB-related in a message sent to a base station (the parent IAB node or the IAB donor) in the RRC connection setup process (or the Attach or TAU or RAU process). The parent IAB node or the IAB donor selects a network element that supports IAB for the IAB node or selects an AMF that supports a requested slice for the IAB node according to the Temp ID and/or the S-NSSAI, or selects an AMF according to the CN identity information in the Temp ID, or selects a default AMF.

Optionally, the IAB node and the AMF exchange S-NSSAI or Slice/Service types supported by the IAB node and the AMF or whether to support TAB; or the IAB donor and the AMF exchange S-NSSAI or Slice/Service types supported by the IAB donor and the AMF or whether to support IAB.

Optionally, the AMF includes S-NSSAI corresponding to the network slice for IAB in an initial context setup request message or a protocol data unit (PDU) session setup/modification/release request message sent to the IAB node or the IAB donor, where the S-NSSAI includes the Slice/Service type (SST) value and/or the slice differentiator (SD) value.

Fifth Embodiment

This embodiment provides a manner for access to an IAB node or an IAB donor. In this embodiment, a core network accessed by the IAB node is 5GC. In this embodiment, a dedicated function entity or network is defined for IAB, and a DCN ID of dedicated core networks (DCN) for IAB is defined. The IAB node obtains the DCN ID for IAB, and an IAB node MT sends the DCN ID to a parent IAB node or the IAB donor in an RRC connection setup process (or an Attach or TAU or RAU process). Alternatively, the IAB node MT includes IAB node indication information or indicates that a connection setup reason value is IAB-related in a message sent to a base station (the parent IAB node or the IAB donor) in the RRC connection setup process. The parent IAB node or the IAB donor selects a network element that supports IAB (such as an MME) according to the DCN ID or the IAB node indication information.

Optionally, the IAB node and the MME exchange DCN IDs supported by the IAB node and the MME or whether to support IAB through an Si interface; or the IAB donor and the MME exchange DCN IDs supported by the IAB donor and the MME or whether to support IAB through the S1 interface.

Sixth Embodiment

This embodiment provides a manner for access to an IAB node or an IAB donor. In this embodiment, the IAB node accesses a network in an NSA or SA manner.

The IAB node sends an MT part identity and/or a DU part identity of the IAB node to a parent IAB node or an IAB donor through an RRC message (for example, an RRC connection setup message). Alternatively, the IAB node sends the MT part identity and/or the DU part identity of the IAB node to the IAB donor through an F1 message (for example, an F1 setup request message). The MT part identity is used for identifying the mobile terminal (MT) part of the IAB node and may specifically include one of a cell-radio network temporary identifier (C-RNTI), an identity of a node or a cell that allocates the C-RNTI, an F1AP ID, an X2AP ID, an XnAP ID, an S1AP ID, an NGAP ID, a GTP TEID, a DU ID, a cell ID, a PCI, or other IDs for identifying the MT part of the IAB node. The DU part identity is used for identifying a DU, CU, or base station of the IAB node and may specifically include one of the DU ID, a CU ID, a base station ID, the cell ID, the PCI, an IP address, or other IDs for identifying the DU part of the IAB node.

After reception, the IAB donor stores and maintains the MT part identity and the DU part identity of the IAB node or a correspondence relationship therebetween.

Seventh Embodiment

Figure 5:
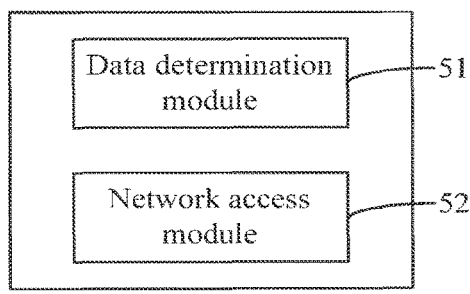
FIG. 5 is a schematic diagram illustrating components of a network access apparatus according to a seventh embodiment of the present application.

This embodiment provides a network access apparatus. Referring to FIG. 5, the network access apparatus includes an information acquisition module 51 and a network access module 52. The data determination module 51 is configured to acquire information about cell access from an upstream IAB node. The network access module 52 is configured to determine a candidate cell and/or execute an access attempt according to the information about the cell access.

In some embodiments, the information about the cell access may include at least one of: information indicating whether a cell is barred, information indicating whether a cell is reserved, information indicating that a cell is reserved for IAB, information indicating that a cell is allowed to be accessed by an IAB node, or access control information.

In some embodiments, the access control information includes access control parameters corresponding to access categories and/or access identities.

In some embodiments, the upstream IAB node may include a parent IAB node or an IAB donor.

In some embodiments, the step in which the current IAB node acquires the information about the cell access from the upstream IAB node includes that the current IAB node acquires the information about the cell access from the upstream IAB node through a system message.

In some embodiments, the step in which the current IAB node determines the candidate cell and/or executes the access attempt according to the information about the cell access includes that the current IAB node determines whether to use a cell corresponding to the information about the cell access as the candidate cell or whether to execute the access attempt according to at least one of an access identity, the access category, or the information about the cell access.

In some embodiments, before the IAB node determines whether to use the cell corresponding to the information about the cell access as the candidate cell or whether to execute the access attempt, the method further includes that the current IAB node determines the access identity and/or the access category according to pre-configuration information and/or a predefined rule.

In some embodiments, the method may further include that the current IAB node sends assistance information to the upstream IAB node.

In some embodiments, the assistance information includes at least one of IAB node indication information, an IAB-related connection setup reason value, a mobile terminal (MT) part identity, a distributed unit (DU) part identity, dedicated core network identity (DCN ID) for IAB, S-NS SAI for IAB, a Slice/Service type (SST) for IAB, a slice differentiator (SD) for IAB, information about S-NSSAI supported by an IAB node, information about a Slice/Service Type supported by an IAB node, information about a DCN ID supported by an IAB node, or information indicating whether to support IAB.

In some embodiments, the step in which the current IAB node sends the assistance information to the upstream IAB node may include that the current IAB node sends the assistance information to the upstream IAB node through at least one of a Radio Resource Control (RRC) message, an F1 message, an X2 message, or an Xn message.

In some embodiments, the method may further include that the current IAB node receives information about the IAB capability of the upstream IAB node or a core network element from the upstream IAB node or the core network element.

In some embodiments, the core network element may include a Mobility Management Entity (MME) or an Access and Mobility Management Function (AMF).

In some embodiments, before or after the current IAB node receives the information about the IAB capability of the core network element from the core network element, the method may further include that the current IAB node sends the information about the IAB capability to the core network element.

In some embodiments, the information about the IAB capability includes at least one of information about supported S-NSSAI, information about a supported Slice/Service Type, information about a supported DCN ID, or information indicating whether to support IAB.

In this embodiment, the IAB node may function as a gNB-DU, and an IAB donor gNB may function as an IAB donor DU and/or an IAB donor CU.

This embodiment provides the network access apparatus, where the current integrated access and backhaul (IAB) node acquires the information about the cell access from the upstream IAB node, and the current IAB node determines the candidate cell and/or executes the access attempt according to the information about the cell access, thereby implementing the access of the IAB node through the information about the cell access and a successful transmission of a data packet.

Eighth Embodiment

Figure 6:
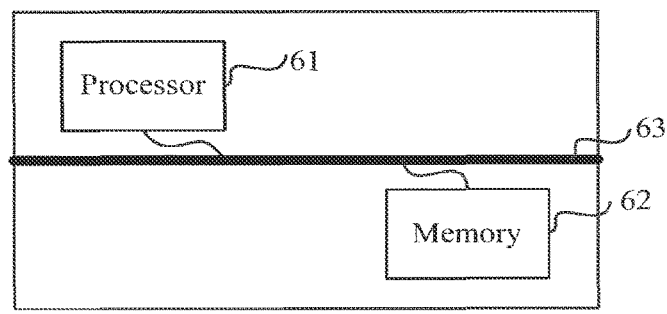
FIG. 6 is a schematic diagram illustrating components of a network device according to an eighth embodiment of the present application.

This embodiment further provides a network device. As shown in FIG. 6, the network device includes a processor 61, a memory 62, and a communication bus 63. The communication bus 63 is configured to implement connection and communication between the processor 61 and the memory 62. The processor 61 is configured to execute one or more computer programs stored in the memory 62 to implement the steps of the network access method according to the embodiments described above. Repetition is not made here.

This embodiment further provides a computer-readable storage medium. The computer-readable storage medium includes volatile or nonvolatile, removable or non-removable media implemented in any method or technology for the storage of information (such as computer-readable instructions, data structures, computer program modules, or other data). The computer-readable storage medium includes, but is not limited to, a random access memory (RAM), a read-only memory (ROM), an electrically erasable programmable read only memory (EEPROM), a flash memory, or other memory technologies, a compact disc read-only memory (CD-ROM), a Digital Versatile Disc (DVD) or another optical disc storage, a magnetic cassette, a magnetic tape, disk storage or another magnetic storage apparatus, or any other medium used for storing desired information and accessible by a computer.

The computer-readable storage medium in this embodiment may be configured to store one or more computer programs executable by a processor to implement at least one step of the network access method in the embodiments described above.

This embodiment further provides a computer program (or computer software) which may be distributed on a computer-readable medium and executed by a computing apparatus to implement at least one step of the network access method in the embodiments described above.

This embodiment further provides a computer program product including a computer-readable apparatus on which the computer program shown above is stored. The computer-readable apparatus in this embodiment may include the computer-readable storage medium shown above.

It can be seen that those skilled in the art should understand that functional modules/units in all or part of the steps of the method, the system, and the apparatus disclosed above may be implemented as software (which may be implemented by computer program codes executable by a computing apparatus), firmware, hardware and appropriate combinations thereof. In the hardware implementation, the division of the functional modules/units mentioned above may not correspond to the division of physical components. For example, one physical component may have multiple functions, or one function or step may be performed jointly by several physical components. Some or all physical components may be implemented as software executed by processors such as central processing units, digital signal processors or microcontrollers, may be implemented as hardware, or may be implemented as integrated circuits such as application-specific integrated circuits.

In addition, as is known to those of ordinary skill in the art, a communication medium generally includes computer-readable instructions, data structures, computer program modules, or other data in modulated data signals such as carriers or other transmission mechanisms and may include any information delivery medium. Therefore, the present application is not limited to any particular combination of hardware and software.

The above content is a more detailed description of the embodiments of the present disclosure in conjunction with specific implementations, and the specific implementation of the present application is not limited to the description. For those of ordinary skill in the art to which the present application pertains, a number of simple deductions or substitutions may be made without departing from the concept of the present application and should fall within the scope of the present application.

What is claimed is:

1. A method performed by a first integrated access and backhaul (IAB) node, comprising:
    acquiring cell access information from a second IAB node or a base station, wherein the first IAB node is capable of providing radio access to a user equipment (UE) and backhauling data to the second IAB node or the base station through air interface, and wherein the first IAB node comprises a distributed unit (DU) part and a mobile termination (MT) part;
    sending assistance information to the second IAB node or the base station, wherein the assistance information comprises IAB node indication information;
    sending at least one of: 1) a DU part identity of the first IAB node; or 2) a MT part identity, to an IAB donor;
    in response to the cell access information indicating that a cell is allowed to be accessed by the first IAB node, determining the cell to be a candidate cell for cell selection; and
    accessing the candidate cell via the MT part of the first IAB node.

2. The method of claim 1, wherein the IAB donor serves as a last hop in a path from the first IAB node to a core network.

3. The method of claim 1, wherein sending the at least one of: 1) the DU part identity of the first IAB node; or 2) the MT part identity comprises:
    sending the at least one of: 1) the DU part identity of the first IAB node; or 2) the MT part identity via one of: an F1 message, or a Radio Resource Control (RRC) message, the F1 message comprising at least an F1 setup request message.

4. The method of claim 1, wherein the second IAB node comprises a parent IAB node or the IAB donor.

5. The method of claim 1, wherein acquiring the cell access information from the second IAB node or the base station comprises:
    acquiring the cell access information from the second IAB node or the base station through a system message.

6. The method of claim 1, wherein the assistance information further comprises at least one of:
    an IAB-related connection setup reason value;
    a mobile terminal part identity;
    a distributed unit (DU) part identity;
    a dedicated core network identity (DCN ID) for IAB;
    Single Network Slice Selection Assistance Information (S-NSSAI) for IAB;
    a Slice/Service type (SST) for IAB;
    a Slice Differentiator (SD) for IAB;
    information about S-NSSAI supported by an IAB node;
    information about an SST supported by an IAB node;
    information about a DCN ID supported by an IAB node; or
    information indicating whether to support IAB.

7. The method of claim 1, wherein sending the assistance information to the second IAB node or the base station comprises:
    sending the assistance information to the second IAB node or the base station through an RRC message.

8. The method of claim 1, further comprising one of:
    receiving information about an IAB capability of the second IAB node or the base station from the second IAB node or the base station; or receiving information about the IAB capability of a core network element from the core network element.

9. The method of claim 8, wherein the information about the IAB capability of the second IAB node, the information about the IAB capability of the base station, and the information about the IAB capability of the core network element comprise at least one of:
information about supported S-NSSAI;
information about a supported SST;
information about a supported DCN ID; or
information indicating whether to support IAB.

10. A device acting as a first integrated access and backhaul (IAB) node, the device comprising a memory for storing computer instructions and a processor in communication with the memory, wherein, when the processor executes the computer instructions, the processor is configured to cause the device to:
acquire cell access information from a second IAB node or a base station, wherein the first IAB node is capable of providing radio access to a user equipment (UE) and backhauling data to the second IAB node or the base station through air interface, and wherein the first IAB node comprises a distributed unit (DU) part and a mobile termination (MT) part;
send assistance information to the second IAB node or the base station, wherein the assistance information comprises IAB node indication information;
send at least one of: 1) a DU part identity of the first IAB node; or 2) a MT part identity, to an IAB donor;
in response to the cell access information indicating that a cell is allowed to be accessed by the first IAB node, determine the cell to be a candidate cell for cell selection; and
access the candidate cell via the MT part of the first IAB node.

11. The device of claim 10, wherein the IAB donor serves as a last hop in a path from the first IAB node to a core network.

12. The device of claim 10, wherein, when the processor is configured to cause the device to send the at least one of: 1) the DU part identity of the first IAB node; or 2) the MT part identity , the processor is configured to cause the device to:
send the at least one of: 1) the DU part identity of the first IAB node; or 2) the MT part identity via one of: an F1 message, or a Radio Resource Control (RRC) message, the F1 message comprising at least an F1 setup request message.

13. The device of claim 10, wherein, when the processor is configured to cause the device to acquire the cell access information from the second IAB node or the base station, the processor is configured to cause the device to:
acquire the cell access information from the second IAB node or the base station through a system message.

14. The device of claim 10, wherein the second IAB node comprises a parent IAB node or the IAB donor.

15. The device of claim 10, wherein, when the processor is configured to cause the device to send the assistance information to the second IAB node or the base station, the processor is configured to cause the device to:
send the assistance information to the second IAB node or the base station through an RRC message.

16. A non-transitory storage medium for storing computer readable instructions, the computer readable instructions, when executed by a processor in a first integrated access and backhaul (IAB) node, causing the processor to:
acquire cell access information from a second IAB node or a base station, wherein the first IAB node is capable of providing radio access to a user equipment (UE) and backhauling data to the second IAB node or the base station through air interface, and wherein the first IAB node comprises a distributed unit (DU) part and a mobile termination (MT) part;
send assistance information to the second IAB node or the base station, wherein the assistance information comprises IAB node indication information;
send at least one of: 1) a DU part identity of the first IAB node; or 2) a MT part identity, to an IAB donor;
in response to the cell access information indicating that a cell is allowed to be accessed by the first IAB node, determine the cell to be a candidate cell for cell selection; and
access the candidate cell via the MT part of the first IAB node.

17. The non-transitory storage medium of claim 16, wherein the IAB donor serves as a last hop in a path from the first IAB node to a core network.

18. The non-transitory storage medium of claim 16, wherein, when the computer readable instructions cause the processor to send the at least one of: 1) the DU part identity of the first IAB node; or 2) the MT part identity, the computer readable instructions cause the processor to:
send the at least one of: 1) the DU part identity of the first IAB node; or 2) the MT part identity via one of: an F1message, or a Radio Resource Control (RRC) message, the F1 message comprising at least an F1 setup request message.

19. The non-transitory storage medium of claim 16, wherein the second IAB node comprises a parent IAB node or the IAB donor.

20. The non-transitory storage medium of claim 16, wherein, when the computer readable instructions cause the processor to acquire the cell access information from the second IAB node or the base station, the computer readable instructions cause the processor to:
acquire the cell access information from the second IAB node or the base station through a system message.

* * * * *